(12) United States Patent
Hernandez

(10) Patent No.: US 12,324,544 B1
(45) Date of Patent: Jun. 10, 2025

(54) HELPER CADDY FOR A CHEF

(71) Applicant: Christina Acosta Hernandez, Phoenix, AZ (US)

(72) Inventor: Christina Acosta Hernandez, Phoenix, AZ (US)

(*) Notice: Subject to any disclaimer, the term of this patent is extended or adjusted under 35 U.S.C. 154(b) by 0 days.

(21) Appl. No.: 18/665,747

(22) Filed: May 16, 2024

(51) Int. Cl.
*A47J 47/16* (2006.01)
*A47G 21/14* (2006.01)

(52) U.S. Cl.
CPC .............. *A47J 47/16* (2013.01); *A47G 21/14* (2013.01)

(58) Field of Classification Search
CPC ..... A47J 47/16; A47G 21/14; A47G 23/0616; A47F 5/0062; A47F 5/00; A47B 46/00; A47B 47/04; A47B 77/16; A47B 81/007
See application file for complete search history.

(56) References Cited

U.S. PATENT DOCUMENTS

| | | | | |
|---|---|---|---|---|
| 359,691 | A * | 3/1887 | Reed | A47B 47/04 211/180 |
| 1,621,491 | A * | 3/1927 | Burke | A47B 77/16 209/357 |
| 3,680,936 | A * | 8/1972 | Backhaus | A47B 46/00 312/7.1 |
| 3,712,521 | A * | 1/1973 | Tanner | D05B 91/14 242/139 |
| 3,948,396 | A * | 4/1976 | Upton | A47B 81/007 D3/25 |
| 4,437,714 | A | 3/1984 | Struck | |
| D369,242 | S | 4/1996 | Tiramani | |
| D451,281 | S | 12/2001 | Wodkowski et al. | |
| 6,412,889 | B1 * | 7/2002 | Hummell | G11B 33/0411 248/447.2 |
| 6,805,246 | B1 | 10/2004 | Manabat | |
| 6,910,580 | B1 | 6/2005 | Frankum | |
| D677,879 | S * | 3/2013 | Gore | D3/25 |
| 10,182,670 | B2 * | 1/2019 | Pretotto | A47F 5/0062 |
| 10,646,078 | B1 * | 5/2020 | Richard | B65D 25/04 |
| 11,033,121 | B1 * | 6/2021 | Gudaitis | A47B 77/16 |
| 11,759,006 | B2 * | 9/2023 | O'Brien | A47B 21/06 211/10 |
| 2006/0108240 | A1 | 5/2006 | MacKinnon | |
| 2007/0085456 | A1 * | 4/2007 | Farrens | A47B 49/00 312/321.5 |
| 2007/0241154 | A1 | 10/2007 | Potts et al. | |
| 2008/0017596 | A1 * | 1/2008 | Brock | A45D 42/00 211/10 |

(Continued)

*Primary Examiner* — Ko H Chan

(74) *Attorney, Agent, or Firm* — Cramer Patent & Design, PLLC.; Aaron R. Cramer

(57) ABSTRACT

The helper caddy for a chef may be a caddy configured for use while cooking. The helper caddy for a chef may comprise a plurality of drawers, a spice rack, a cooking utensil holder, a match holder, a toothpick holder, and a hook. The plurality of drawers may be configured to store flatware. The spice rack may store a plurality of spice containers. The cooking utensil holder may hold cooking utensils. The match holder may hold fireplace matches and/or utility lighters. The toothpick holder may store toothpicks. The hook may be configured to support bulky items. As non-limiting examples, the flatware may comprise forks, tablespoons, and knives, the cooking utensils may comprise tongs, spatulas, grill scrubs, and mixing spoons, and the bulky items may be an oven mitt, a rag, or an apron.

2 Claims, 8 Drawing Sheets

(56) References Cited

U.S. PATENT DOCUMENTS

| | | | |
|---|---|---|---|
| 2015/0130336 A1* | 5/2015 | Stewart | A47B 77/16 |
| | | | 312/243 |
| 2017/0208940 A1* | 7/2017 | Boudreault | A47F 3/02 |
| 2018/0271336 A1* | 9/2018 | Mingo | A47K 7/024 |
| 2019/0191875 A1* | 6/2019 | Eburne | A47J 43/0727 |
| 2019/0373994 A1 | 12/2019 | Zemel et al. | |
| 2020/0037759 A1* | 2/2020 | Ward | A47F 5/0062 |

* cited by examiner

HELPER CADDY FOR A CHEF

RELATED APPLICATIONS

None.

FIELD OF THE DEVICE

The presently disclosed subject matter is directed to kitchen storage and organization devices, specifically to a multifunctional caddy designed to assist chefs and cooking enthusiasts by providing a centralized location for storing and accessing culinary tools, spices, and other kitchen essentials. This device integrates storage solutions with technology for enhanced convenience and efficiency in food preparation environments.

BACKGROUND OF THE DEVICE

In the realm of culinary arts, efficiency and organization play pivotal roles in the seamless execution of cooking tasks. Chefs and cooking enthusiasts often face challenges in maintaining an organized workspace due to the myriad of utensils, flatware, spices, and other cooking essentials needed within arm's reach. Traditional kitchen storage solutions typically address individual storage needs, such as separate holders for utensils, spices, and flatware, leading to clutter and inefficiency. Furthermore, the growing integration of technology in the kitchen, such as the use of electronic recipes and the desire for multimedia entertainment while cooking, introduces additional demands on the chef's workspace. There exists a need for a comprehensive solution that not only addresses the storage and organization of physical cooking tools and essentials but also seamlessly integrates technological conveniences into the culinary environment. The present device aims to fill this gap by providing a helper caddy for a chef that combines a multifunctional storage system with an integrated wireless speaker, thus facilitating a more organized, efficient, and enjoyable cooking experience.

SUMMARY OF THE DEVICE

Embodiments of the present disclosure may include a helper caddy for a chef including a caddy body including a plurality of walls defining an interior space. Embodiments may also include a plurality of drawers positioned within the interior space of the caddy body, each drawer configured to store flatware. Embodiments may also include a spice rack affixed to the caddy body, the spice rack including at least two tiers configured to hold a plurality of spice containers.

Embodiments may also include a cooking utensil holder coupled to the caddy body for storing cooking utensils. Embodiments may also include a match holder integrated into the caddy body for storing matches and/or utility lighters. Embodiments may also include a toothpick holder coupled to the caddy body for storing toothpicks. Embodiments may also include a hook attached to the caddy body configured to support bulky items. Embodiments may also include a wireless speaker bonded to or integrated with the caddy body for providing audio output.

In some embodiments, the caddy body may be composed of one or more materials selected from the group consisting of metal, plastic, glass, ceramic, and combinations thereof. In some embodiments, the spice rack may include an upper tier and a lower tier, each tier having a front wall, a rear wall, a left side wall, a right side wall, and a bottom wall, configured to retain the plurality of spice containers.

Embodiments may also include at least one of the bottom walls of the tiers serves as a portion of an enclosure for the plurality of drawers. Embodiments may also include each drawer includes a knob adapted to facilitate opening and closing of the drawer. Embodiments may also include each spice container includes a clear body and a detachable lid, the lid configured to create a seal with the clear body to preserve the freshness of the contents.

In some embodiments, the clear body may be made from a material selected from the group consisting of glass and non-opaque plastic, and the lid may be made from a material selected from the group consisting of metal and plastic. In some embodiments, the wireless speaker may be in electrical communication with a power supply and includes a volume control and a power switch.

In some embodiments, the helper caddy for a chef may include communication means for wirelessly connecting the wireless speaker to a personal electronic device. In some embodiments, the caddy may be configured to be placed on a work surface within a food preparation area, facilitating easy access to cooking utensils, flatware, and other culinary tools. In some embodiments, the helper caddy for a chef, where the match holder and the toothpick holder may be aligned with a wall of the caddy body, enabling efficient use of space and organization.

A specific embodiment is characterized by a caddy body constructed from a selection of materials, including metal, plastic, glass, ceramic, or a combination thereof, forming a sturdy and aesthetically appealing structure. The caddy body is meticulously engineered, featuring a multitude of walls that delineate an expansive interior space. Positioned within this interior space are several drawers, each configured to store flatware, thereby ensuring that essential utensils are always within reach and neatly organized. Further augmenting its utility, the caddy boasts a spice rack, securely affixed to the caddy body. This rack is distinguished by its two-tiered design, capable of accommodating a multitude of spice containers, thus making a variety of spices readily accessible to the chef. Additionally, this embodiment incorporates a cooking utensil holder, seamlessly coupled to the caddy body, offering a dedicated space for storing cooking utensils. A match holder and a toothpick holder are also integrated into the design, both of which are aligned with the caddy body to maximize spatial efficiency and maintain an organized setup. For items of bulkier nature, a hook is thoughtfully attached to the caddy body, further expanding its storage capability. A notable feature of this embodiment is the inclusion of a wireless speaker, either bonded to or integrated within the caddy body, providing not only audio output but also enabling wireless communication with a personal electronic device. This allows chefs to enjoy music or follow along with cooking tutorials hands-free, thereby enhancing the cooking experience. The design is such that the bottom wall of at least one tier of the spice rack doubles as part of the enclosure for the drawers, showcasing an ingenious use of space. Each drawer is equipped with a knob, simplifying the process of opening and closing, while every spice container features a clear body paired with a detachable lid—crafted from materials like glass, non-opaque plastic, metal, or plastic—to ensure the longevity and freshness of its contents. This embodiment is envisioned to be placed on a work surface within a food preparation area, this helper caddy for a chef is a testament to thoughtful design, facilitating unparalleled access to cooking utensils, flatware, and other essential culinary tools. The strategic alignment of the match and toothpick holders with the caddy body's wall underscores the embodiment's commitment to efficient space use and organizational excellence, thereby embodying a solution that addresses the multifaceted needs of chefs and cooking enthusiasts alike.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
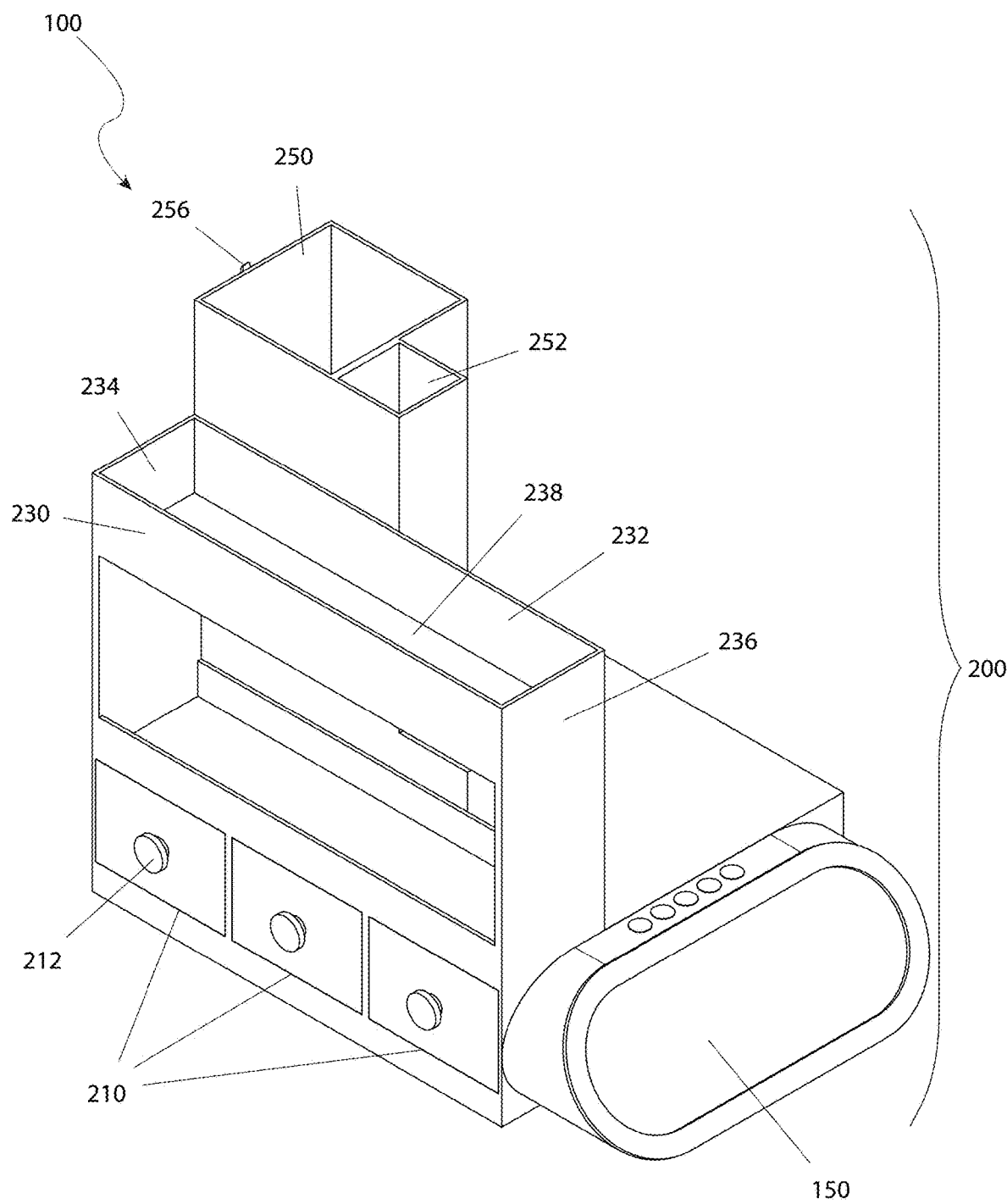
FIG. 1 is a front isometric view of a helper caddy for a chef 100, according to an embodiment of the present device.
Figure 2:
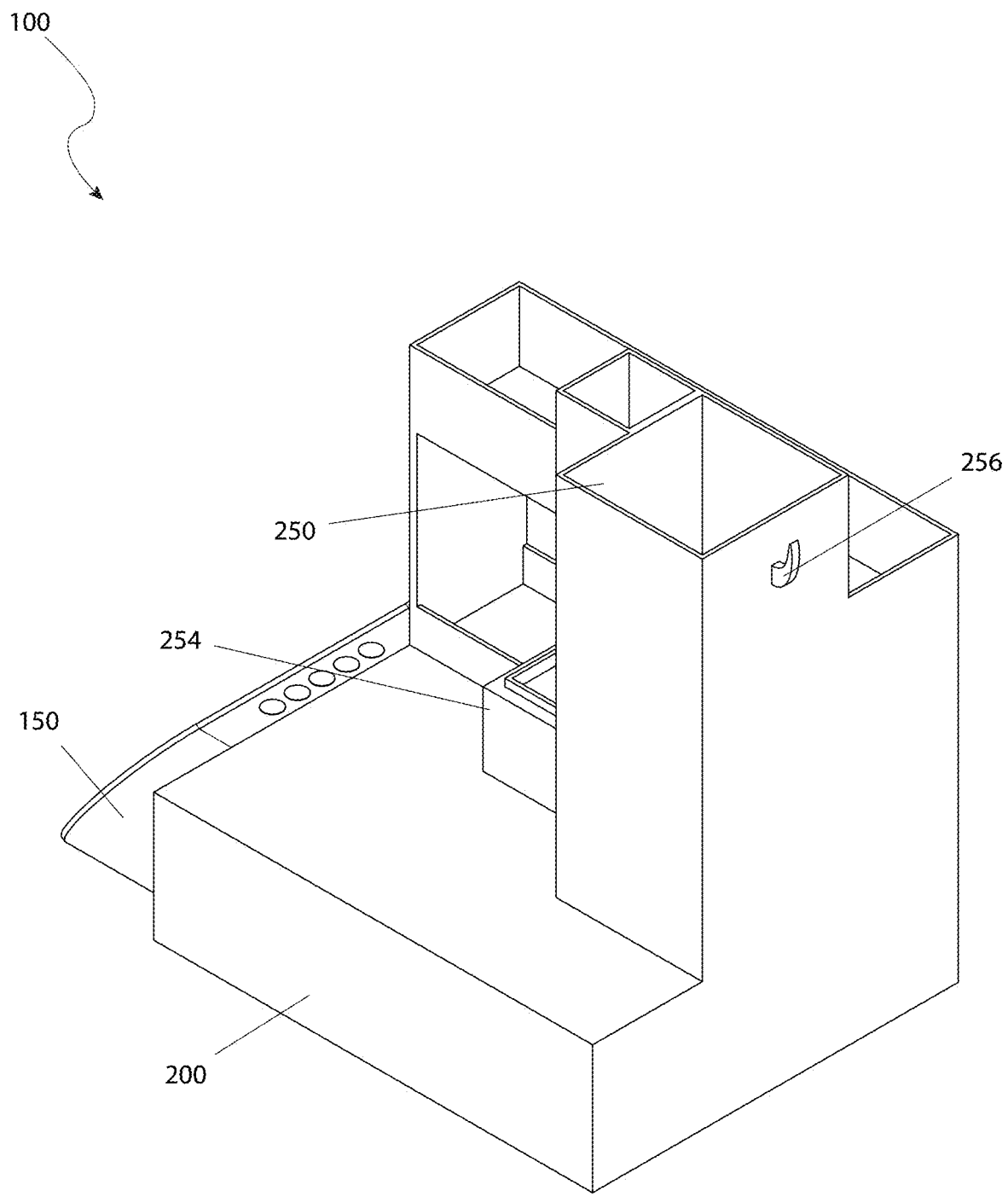
FIG. 2 is a rear isometric view of a helper caddy for a chef 100, according to an embodiment of the present device.
Figure 3:
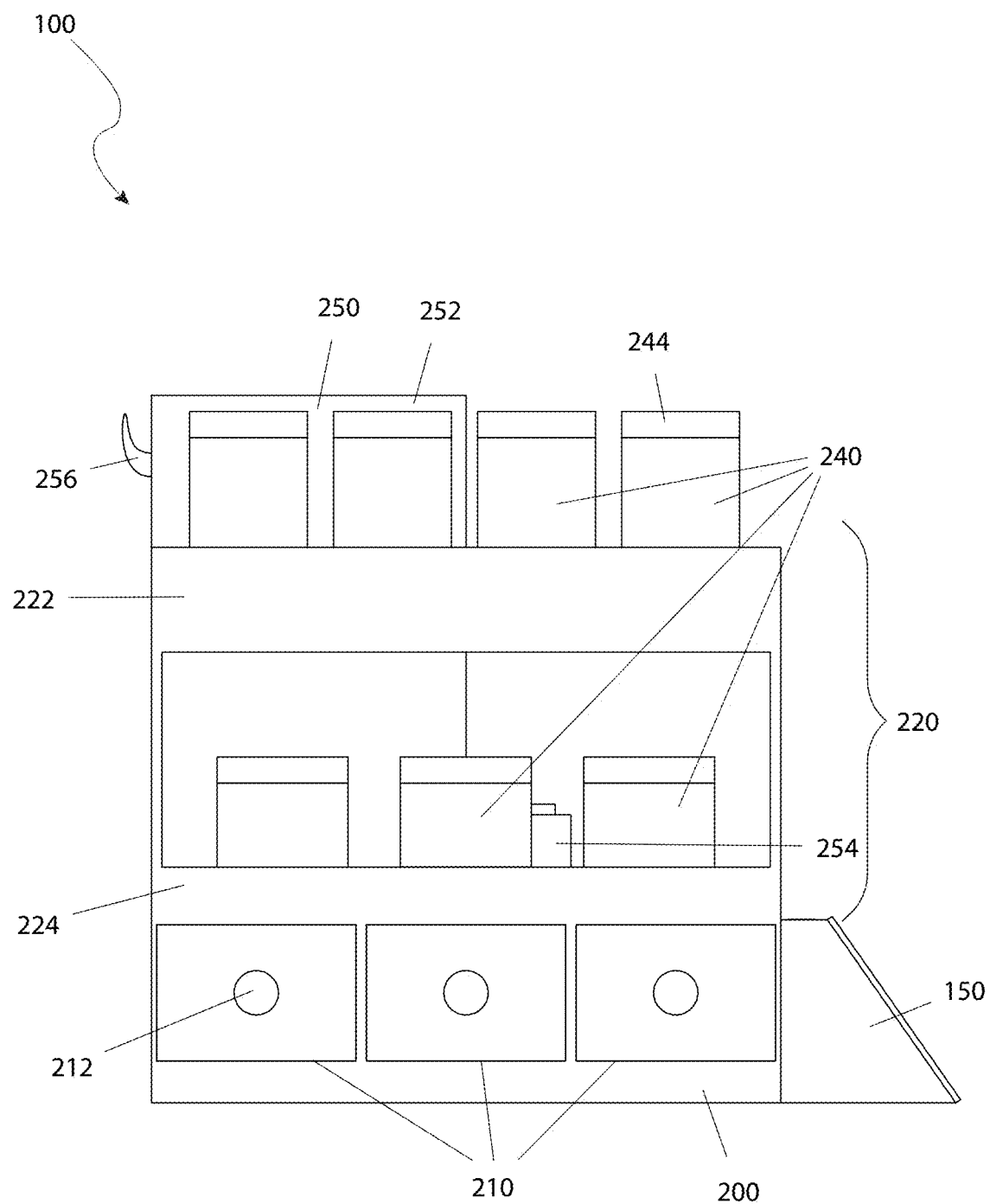
FIG. 3 is a front view of a helper caddy for a chef 100, according to an embodiment of the present device.
Figure 4:
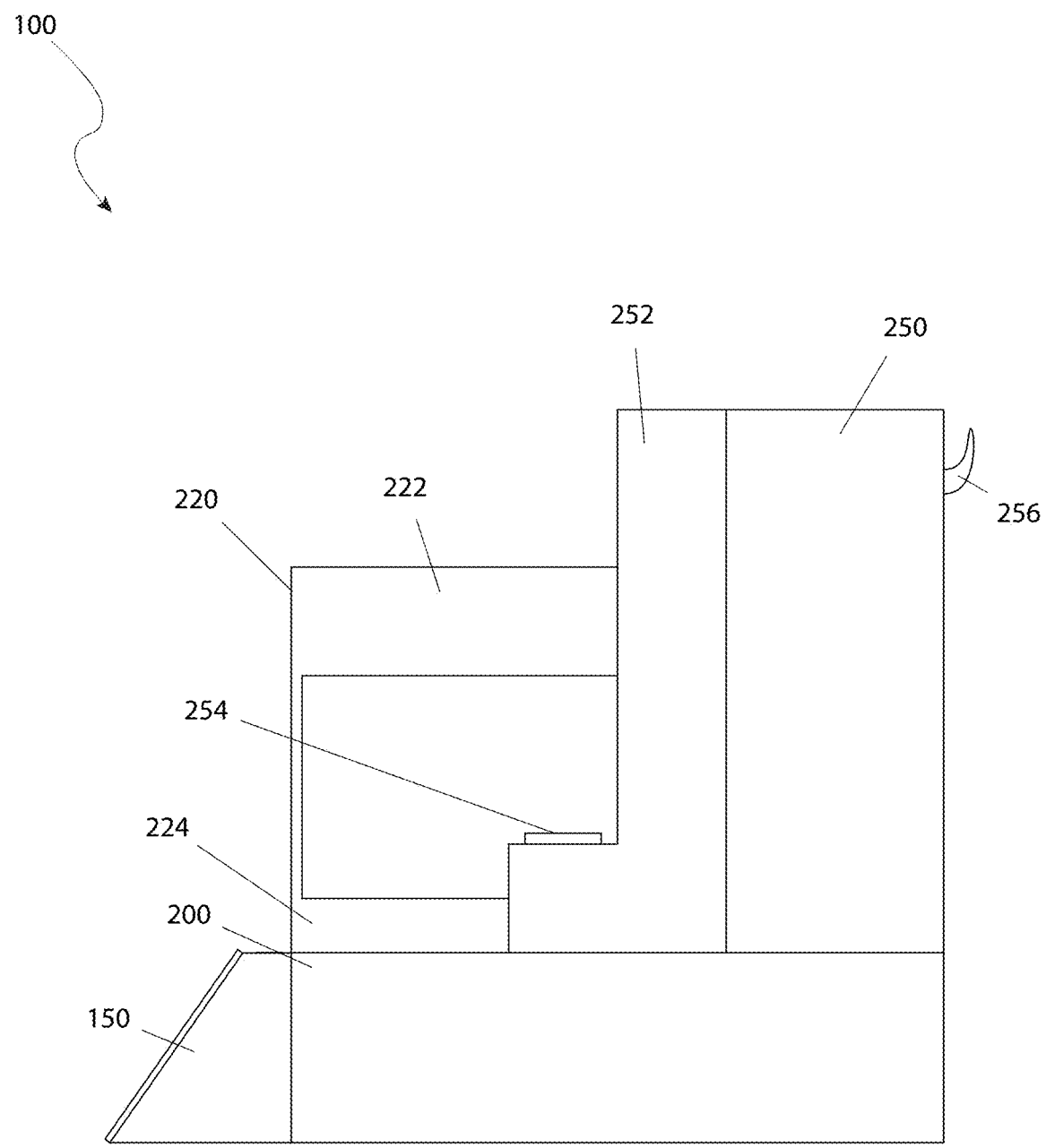
FIG. 4 is a rear view of a helper caddy for a chef 100, according to an embodiment of the present device.
Figure 5:
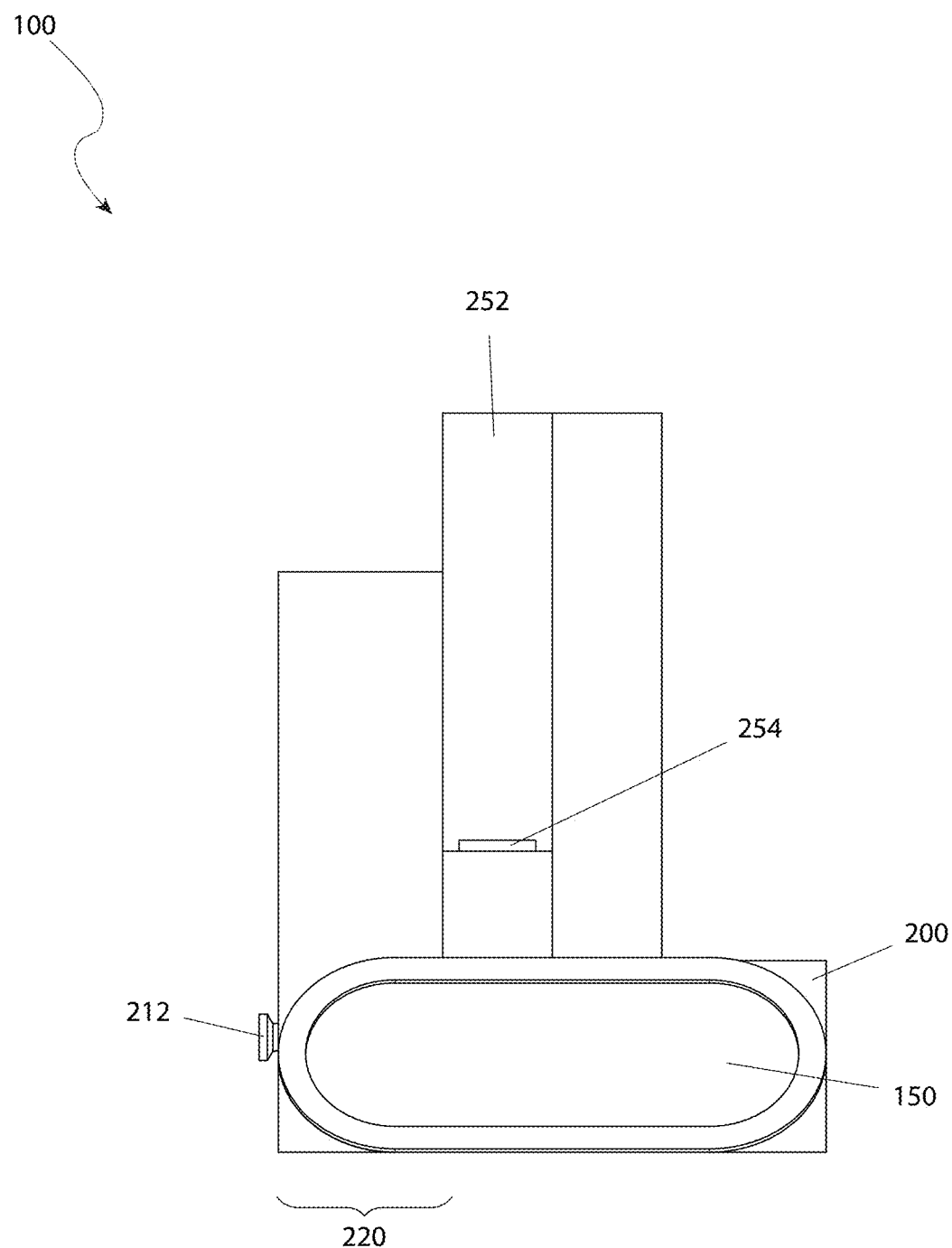
FIG. 5 is a right side view of a helper caddy for a chef 100, according to an embodiment of the present device.
Figure 6:
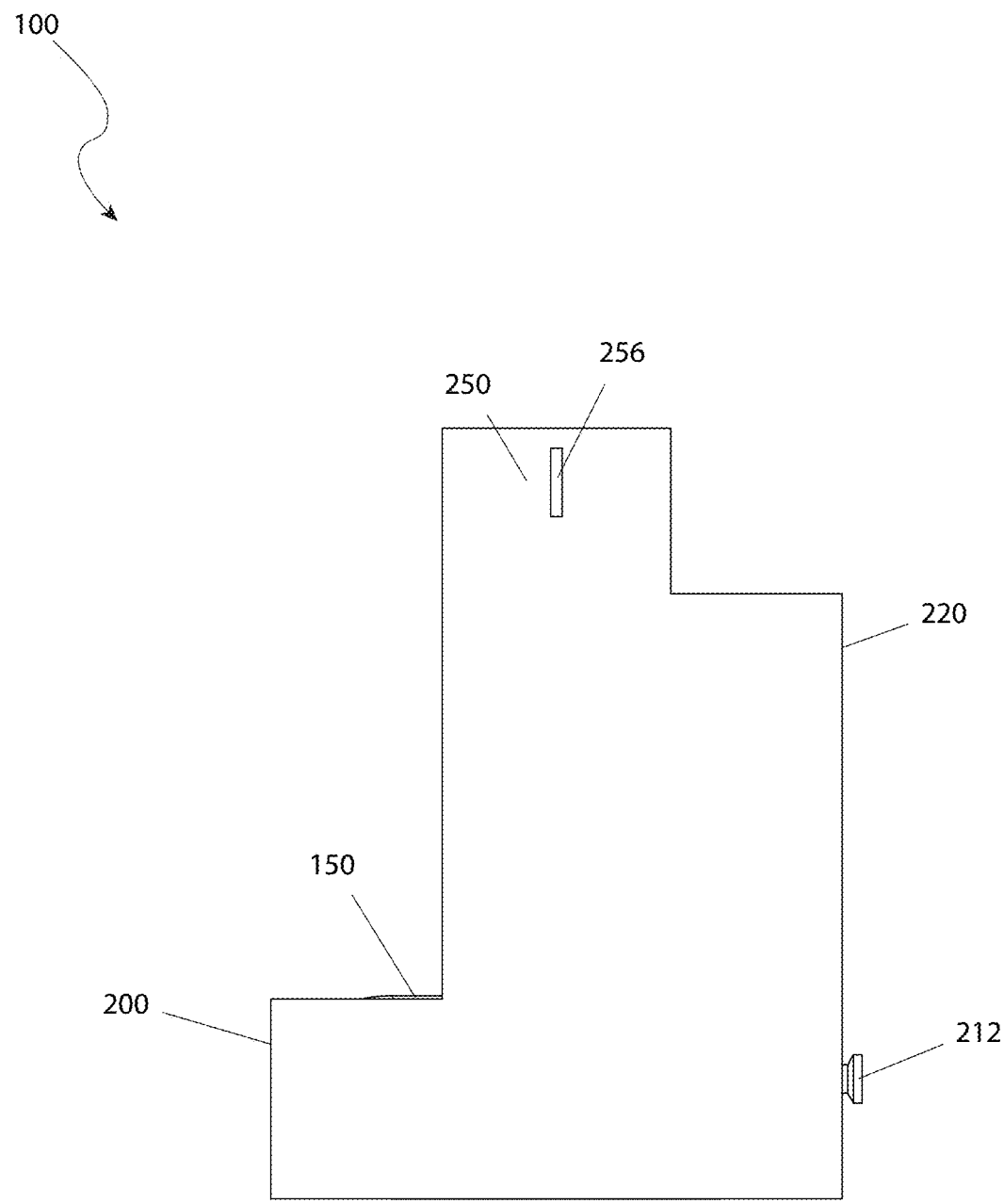
FIG. 6 is a left side view of a helper caddy for a chef 100, according to an embodiment of the present device.
Figure 7:
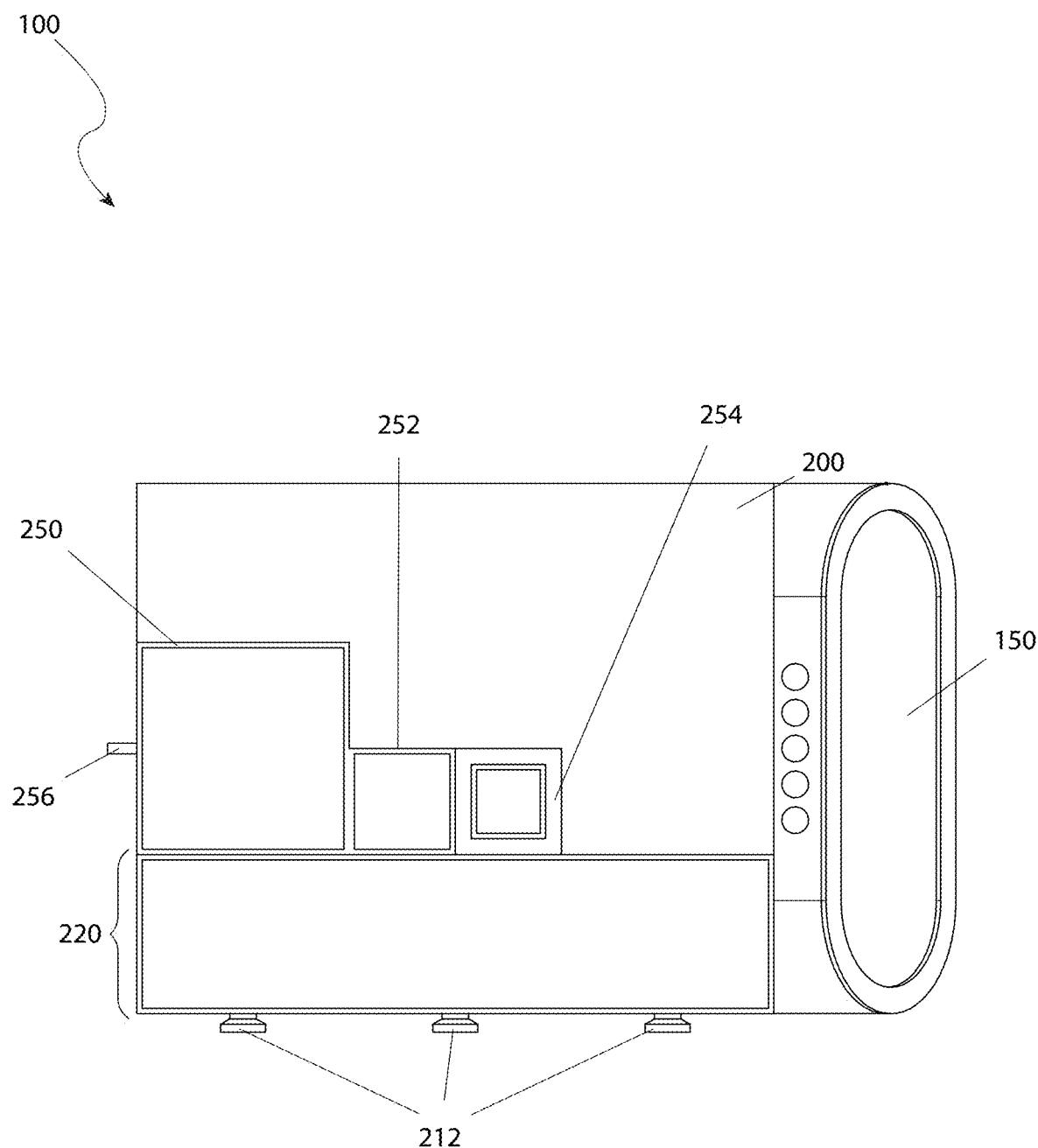
FIG. 7 is a top view of a helper caddy for a chef 100, according to an embodiment of the present device; and, FIG. 8 is a bottom view of a helper caddy for a chef 100, according to an embodiment of the present device.
Figure 8:
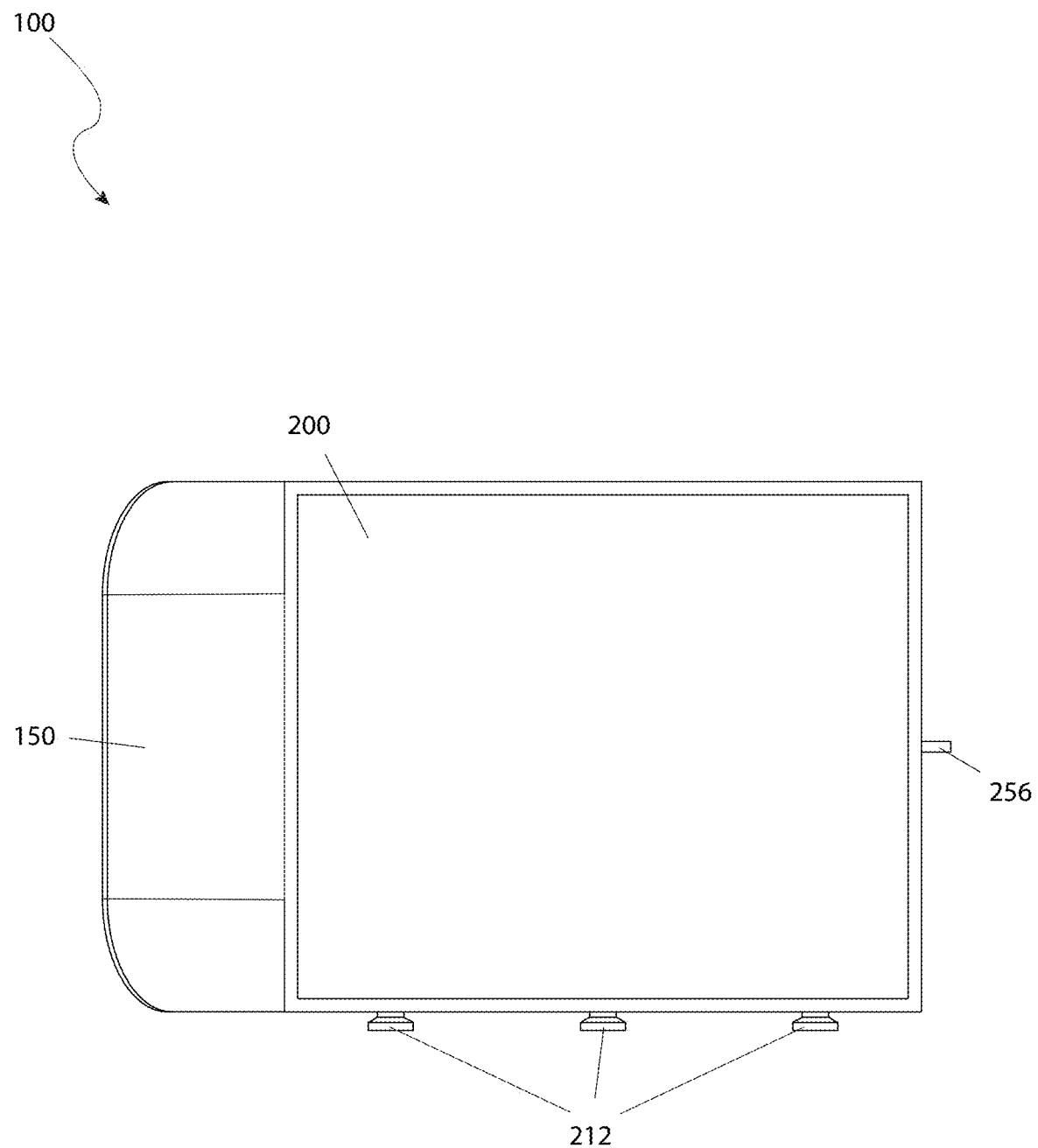

DESCRIPTIVE KEY 100 helper caddy for a chef
150 wireless speaker
200 caddy
210 drawer
212 knob
220 spice rack
222 upper tier
224 lower tier
230 front wall
232 rear wall
234 left side wall
236 right side wall
238 bottom wall
240 spice container
242 clear body
244 lid
250 cooking utensil holder
252 match holder
254 toothpick holder
256 hook Description of the Device The present device is directed to a helper caddy for a chef (herein described as the "device") 100. The helper caddy for a chef 100 may be a caddy 200 configured for use while cooking. The helper caddy for a chef 100 may comprise a plurality of drawers 210, a spice rack 220, a cooking utensil holder 250, a match holder 252, a toothpick holder 254, and a hook 256. A wireless speaker 150 may be bonded to a wall of the caddy 200. The plurality of drawers 210 may be configured to store flatware. The spice rack 220 may store a plurality of spice containers 240. The cooking utensil holder 250 may hold cooking utensils. The match holder 252 may hold fireplace matches and/or utility lighters. The toothpick holder 254 may store toothpicks. The hook 256 may be configured to support bulky items. As non-limiting examples, the flatware may comprise forks, tablespoons, and knives, the cooking utensils may comprise tongs, spatulas, grill scrubs, and mixing spoons, and the bulky items may be an oven mitt, a rag, or an apron.

The caddy 200 may comprise the plurality of drawers 210 oriented to open out from the bottom front of the caddy 200. The plurality of drawers 210 may store the flatware. In a preferred embodiment, the caddy 200 may comprise three (3) drawers 210. An individual drawer 210 may comprise four (4) drawer side walls, a drawer bottom wall, and an open top. The individual drawer 210 may comprise a knob 212 adapted to be grasped by a user while opening and closing the individual drawer 210.

As non-limiting examples, the caddy 200 may be made from metal such as stainless steel, copper, or cast iron, plastics such as acrylonitrile butadiene styrene (ABS), high-density polyethylene (HDPE), acrylic, or polypropylene, glass, ceramic, or any combination thereof.

The spice rack 220 may be configured to store the plurality of spice containers 240. The spice rack 220 may comprise multiple tiers that may be stacked at multiple heights. In a preferred embodiment, the spice rack 220 may comprise two (2) tiers.

Such a spice rack 220 having two (2) tiers may comprise a lower tier 224 and an upper tier 222. The lower tier 224 may be located above the plurality of drawers 210. The upper tier 222 may be located above the lower tier 224.

An individual tier 222, 224 may comprise a front wall 230, a rear wall 232, a left side wall 234, a right side wall 236, and a bottom wall 238. In some embodiments, the front wall 230, the rear wall 232, the left side wall 234, the right side wall 236, the bottom wall 238, or any combination thereof may be shared with another element of the caddy 200. As a non-limiting example, the bottom wall 238 of the lower tier 224 may be a portion of an enclosure for the plurality of drawers 210.

The front wall 230, the rear wall 232, the left side wall 234, and the right side wall 236 may rise above the bottom wall 238 such that the front wall 230, the rear wall 232, the left side wall 234, and the right side wall 236 prevent the plurality of spice containers 240 from sliding off of the individual tier 222, 224. In some embodiments, the left side wall 234 and the right side wall 236 of the lower tier 224 may rise higher than the front wall 230 and the rear wall 232 such that the left side wall 234 and the right side wall 236 may support the upper tier 222.

The plurality of spice containers 240 may hold spices. Each spice container 240 may have a diameter that is smaller than the front-to-rear spacing between the front wall 230 and the rear wall 232 of the individual tier such that the plurality of spice containers 240 fit on the spice rack 220. An individual spice container 240 may comprise a clear body 242 and a lid 244. The lid 244 may detachably couple to the clear body 242 to create a seal that may preserve the freshness of the spices. As a non-limiting example, the lid 244 may threadably couple to the clear body 242.

As non-limiting examples, the clear body 242 may be made of glass or non-opaque plastic and the lid 244 may be made from metal or plastic.

The wireless speaker 150 may be bonded to or integral with the right side wall 236 of the caddy 200. The wireless speaker 150 may provide wireless communication with a personal electronic device to control said wireless speaker 150. The wireless speaker 150 will be in electrical communication with a power supply, either on-board, or to a wall socket via an adaptor, and have volume control and a power switch, although other features such as communication ports are understood to fall under the overall scope of the device.

The cooking utensil holder 250 may be an open top container that may be aligned with a side of the caddy 200. The cooking utensil holder 250 may be coupled to the top of the caddy 200. The cooking utensil holder 250 may be taller than the spice rack 220 such that the cooking utensil holder 250 provides depth to hold the long handles of the cooking utensils. The hook 256 may be coupled to a wall of the cooking utensil holder 250 that is aligned with a wall of the caddy 200 such that the caddy 200 may be placed at the edge of a work surface and items hung from the hook 256 may extend down past the work surface.

The match holder 252 may be an open top container having a smaller footprint but the same height as the cooking utensil holder 250. The toothpick holder 254 may be an open top container having a lower height than the cooking utensil holder 250. The cooking utensil holder 250 and the toothpick holder 254 may be coupled to the top of the caddy 200.

In use, the caddy 200 may be placed on a work surface near a food preparation area. As non-limiting examples, the work surface may comprise a table, a counter, or a grill shelf. Cooking utensils may be placed into the cooking utensil holder 250 for easy access. Fireplace matches and/or utility lighters may be stored in the match holder 252. Toothpicks may be stocked in the toothpick holder 254. Flatware may be stored in the plurality of drawers 210 and removed for use as needed.

A specific embodiment of the helper caddy for a chef (100) is presented and designed to enhance the efficiency and organization of culinary tasks. This embodiment consists of a caddy body (200) constructed from a durable blend of materials, including metal, plastic, glass, ceramic, or combinations thereof, providing a robust and aesthetically pleasing structure. The interior of the caddy body (200) is ingeniously designed with a plurality of walls that define a spacious interior capable of housing several functional components.

Integrated within this space are multiple drawers (210), each equipped with a knob (212) for ease of access and configured specifically for storing various flatware items. Above these drawers (210), a spice rack (220), featuring an upper tier (222) and a lower tier (224), is affixed to the caddy body (200). Each tier is thoughtfully designed with a front wall (230), a rear wall (232), a left side wall (234), and a right side wall (236), alongside a bottom wall (238) that, in certain configurations, doubles as part of the enclosure for the drawers (210). This rack holds multiple spice containers (240), each consisting of a clear body (242) with a detachable lid (244) crafted from either glass or non-opaque plastic and metal or plastic, respectively, ensuring the contents' freshness is meticulously preserved.

This embodiment includes a cooking utensil holder (250), a match holder (252), and a toothpick holder (254), each integrated into the caddy body (200) and aligned to maximize space efficiency and organization. The utensil holder (250), positioned for optimal accessibility, accommodates a variety of cooking tools, while the match (252) and toothpick holders (254) offer convenient storage for smaller essentials. A hook (256) is also attached to the caddy body (200), designed to support bulkier items, enhancing the caddy's storage capabilities.

This embodiment has the wireless speaker (150), seamlessly bonded to or integrated with the caddy body (200). This speaker (150) is in electrical communication with a power supply and features volume control and a power switch. It also includes communication means for wireless connectivity to personal electronic devices, allowing chefs to enjoy multimedia entertainment or follow digital recipes hands-free. Positioned on a work surface within a food preparation area, this helper caddy for a chef (100) serves as a central hub for culinary tools and entertainment, facilitating a well-organized and enjoyable cooking environment.

The exact specifications, materials used, and method of use of the helper caddy for a chef 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A helper caddy for a chef comprising:
   a caddy body having a plurality of walls defining an interior space;
   a plurality of drawers positioned within a lower portion of the interior space of the caddy body, wherein each drawer comprises four drawer side walls, a drawer bottom wall, an open top, and a knob adapted to be grasped by a user for opening and closing each drawer;
   a spice rack positioned above the plurality of drawers, the spice rack comprising an upper tier and a lower tier, wherein the lower tier comprises side walls extending vertically above a front wall and a rear wall, wherein the side walls of the lower tier are configured to directly support the upper tier;
   a cooking utensil holder coupled to a top surface of the caddy body and configured to store cooking utensils, the cooking utensil holder having a vertical height greater than a vertical height of the upper tier and lower tier of the spice rack;
   a hook coupled directly to an outer wall of the cooking utensil holder, wherein the hook is aligned vertically below the cooking utensil holder and configured to support bulky items such that when the caddy is placed on an edge of a work surface, the bulky items hung from the hook extend downwardly past the edge of the work surface; and
   a wireless speaker integrally bonded to the caddy body and configured for wireless communication with a personal electronic device, wherein the wireless speaker includes a volume control, a power switch, and electrical communication means for connection to a power supply.

2. The helper caddy for a chef of claim 1, further comprising:
   a match holder and a toothpick holder, each comprising an open-top container integrally coupled to and aligned with the top surface of the caddy body, wherein the match holder and the toothpick holder are positioned adjacent to the cooking utensil holder, the match holder having a vertical height substantially equal to the vertical height of the cooking utensil holder, and the toothpick holder having a vertical height less than the vertical height of the cooking utensil holder.

* * * * *